Aug. 11, 1925.
W. B. BRONANDER
ROLLER BEARING
Filed Sept. 23, 1920
1,548,821
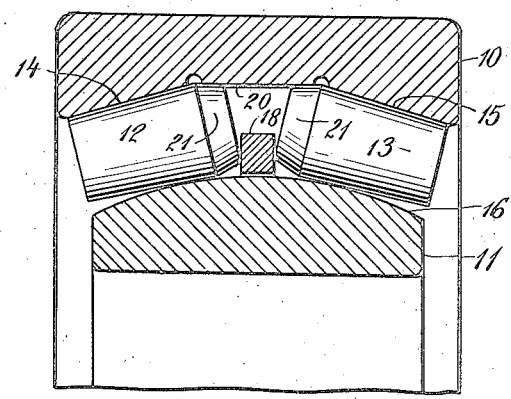
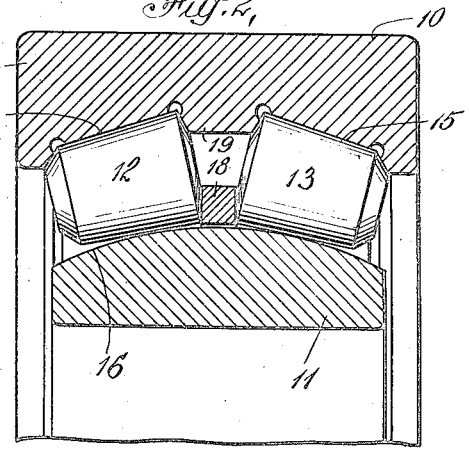
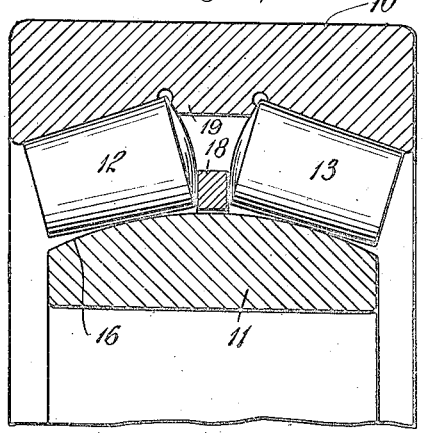
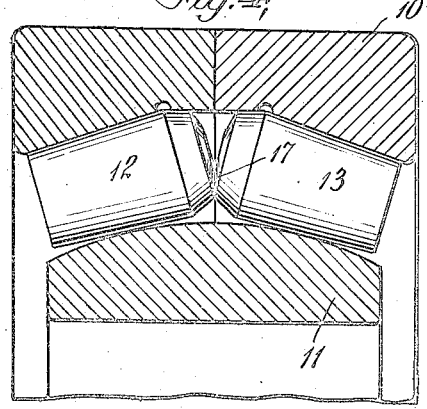
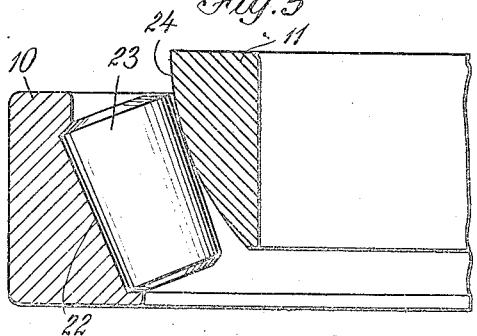
Inventor
Wilhelm B. Bronander
By his Attorney
E. W. Marshall Patented Aug. 11, 1925.

1,548,821

UNITED STATES PATENT OFFICE.

WILHELM B. BRONANDER, OF MONTCLAIR, NEW JERSEY.

ROLLER BEARING.

Application filed September 23, 1920. Serial No. 412,223.

*To all whom it may concern:*

Be it known that I, WILHELM B. BRONANDER, a citizen of the United States, and a resident of Montclair, Essex county, and State of New Jersey, have invented certain new and useful Improvements in Roller Bearings, of which the following is a specification.

The objects of this invention are to provide a simple and practical roller bearing construction capable of carrying both radial and thrust loads and which will be self-alining.

In the accompanying drawing I have illustrated the invention embodied in a number of different forms, but wish it understood that the structure may be further modified without departure from the true spirit and scope of the invention.

In the drawing referred to:

Figures 1, 2, 3, and 4 are broken sectional views, illustrating different forms of double thrust bearings having features of the invention incorporated therein.

Figure 5 is a similar view of a single thrust type of bearing embodying the invention.

The outer and inner race rings or companion bearing elements are designated 10 and 11.

In the first four forms of the invention illustrated, there are two rows of rollers 12 and 13 interposed between the bearing elements and the outer bearing element is constructed with tracks 14 and 15 and inclined toward each other, while the inner bearing element is made with a convex track 16 opposed to the two relatively inclined tracks.

Also, the rollers in each of these instances are tapered toward their outer ends, such taper being in accordance with the inclination of the tracks, so as to cause the rollers to roll smoothly and evenly thereover. This outward taper also in effect interlocks the larger inner ends of the rollers in the bearing and positions the heavier portion of the rollers at the inner part of the bearing, where the load is heaviest. The convexity of the track on the inner race ring makes the rings self-alining so that the bearing members can automatically set themselves to correct inaccuracies in alinment.

The two sets of rollers are forced outwardly over the inclines of the tracks by suitable spacing means, as by causing the inner ends of the rollers to engage each other, as shown at 17 in Figure 4, or by interposing separate spacing devices between the adjoining ends of the rollers. These spacing devices may be in the form of a separating rib 19 formed on the intermediate portion of the member 10 between the two inclined track-ways thereon. Another method is to simply form a flat track 20 between the relatively inclined tracks and to construct the inner ends of the rollers with frusto-conical bearing portions 21 riding over this intermediate track.

These various methods of holding the rollers properly seated on their inclined tracks may be combined in different ways, as I have suggested in the several views.

In Figure 5 I have shown the invention adapted to a single thrust bearing, the outer member in this instance having a single inclined conical track 22 with an angularly related thrust track or shoulder at one or both sides of the same, for a single set of tapered rollers 23 and the inner member having the segment of a curved track 24 bearing on the single set of rollers and adjustable thereon for self-alining purposes.

What I claim is:

1. A roller thrust bearing comprising a bearing member having reversely inclined conical tracks and a thrust receiving track therebetween, a second bearing member having a convex track opposed to the reversely inclined conical tracks and reversely inclined rollers of conical construction engaged between the relatively inclined tracks and the convex track and having bearing portions at their proximate ends engaging the intermediate thrust receiving track aforesaid.

2. A roller thrust bearing comprising a bearing member having a conical track and an angularly related thrust track at one side of the same, a second bearing member having a convex track opposed to the tracks of the first member and inclined tapered rollers engaged between said members and having bearing portions at their ends engaging the thrust track aforesaid.

3. A roller thrust bearing comprising a bearing member having a conical track and an angularly related thrust track at one side of the same, a second bearing member having a convex track opposed to the tracks of the first member and a series of inclined tapered rollers engaged between said members and having bearing portions at their larger ends in engagement with the thrust track aforesaid.

In witness whereof, I have hereunto set my hand this 14" day of September, 1920.

WILHELM B. BRONANDER.